(12) United States Patent
Dumitrescu et al.

(10) Patent No.: US 7,084,237 B2
(45) Date of Patent: Aug. 1, 2006

(54) USE OF STANNYLENES AND GERMYLENES AS POLYMERIZATION CATALYSTS FOR HETEROCYCLES

(75) Inventors: Anca Dumitrescu, Toulouse (FR); Heinz Gornitzka, Pompertuzat (FR); Blanca Martin-Vaca, Toulouse (FR); Didier Bourissou, Plaisance du Touch (FR); Guy Bertrand, Riverside, CA (US); Jean-Bernard Cazaux, Aramon (FR)

(73) Assignees: Societe de Conseils de Recherches et d'Applications Scientifiques (S.C.R.A.S.) (FR); Centre National de la Recherche Scientifique (FR)

( * ) Notice: Subject to any disclaimer, the term of this patent is extended or adjusted under 35 U.S.C. 154(b) by 178 days.

(21) Appl. No.: 10/275,332

(22) PCT Filed: May 10, 2001

(86) PCT No.: PCT/FR01/01405

§ 371 (c)(1),
(2), (4) Date: Nov. 7, 2002

(87) PCT Pub. No.: WO01/88014

PCT Pub. Date: Nov. 22, 2001

(65) Prior Publication Data

US 2003/0153717 A1 Aug. 14, 2003

(30) Foreign Application Priority Data

May 15, 2000 (EP) .......................................... 00401309

(51) Int. Cl.
*C08G 65/26* (2006.01)

(52) U.S. Cl. .................. 528/410; 528/403; 528/421; 528/18; 528/40; 528/377; 528/378; 528/380; 528/402

(58) Field of Classification Search ............... 528/18, 528/40, 410, 403, 421, 377, 378, 380, 402, 528/63, 64, 65, 66, 167, 168, 169, 170
See application file for complete search history.

(56) References Cited

U.S. PATENT DOCUMENTS

| 3,839,297 | A | | 10/1974 | Wasserman et al. |
|---|---|---|---|---|
| 5,210,162 | A | * | 5/1993 | Eck et al. .................. 526/192 |
| 5,430,125 | A | * | 7/1995 | Hori et al. ................. 528/354 |
| 6,255,515 | B1 | * | 7/2001 | Kato et al. ................. 556/478 |

FOREIGN PATENT DOCUMENTS

| EP | 0612780 | 8/1994 |
|---|---|---|
| EP | 0890575 | 1/1999 |
| WO | 9742197 | 11/1997 |

OTHER PUBLICATIONS

Kobayashi et al, "A Germylene . . . Initiator", Makromolekulare Cheimie: Macromolecular Symposia, vol. 54/55, Feb. 1, 1992.
Kricheldort et al, "Polyactones . . . Pentaerythritol", Macromolecules, US American Chemical Society, Easton, vol. 29, No. 27, Dec. 30, 1996 pp. 8689–8695.

* cited by examiner

*Primary Examiner*—Susan Berman
(74) *Attorney, Agent, or Firm*—Charles A. Muserlian

(57) ABSTRACT

The use of stannylenes and germylenes of general formula (I) wherein: M represents a tin or geranium atom; $L_1$ and $L_2$ independently represent a group of formula: $-E_{14}(R_{14})(R'_{14})(R''_{14})$, $-E_{15}(R_{15})(R'_{15})$ or $-E_{16}(R_{16}))$ or together form a chain of formula $-L'_1-A-L'_2$; A represents a saturated or unsaturated chain comprising one, two or three elements of group 14; $L'_1$ and $L'_2$, represent, independently, a group of formula: $-E_{14}(R_{14})(R'_{14})$-, $E_{15}(R_{15})$- or $-E_{16}$-; $E_{14}$ is an element of group 14; $E_{15}$ is an element of group 15; $E_{16}$ is an element of group 16; $R_{14}$, $R'_{14}$, $R''_{14}$, $R_{15}$, $R'_{15}$ and $R_{16}$ represent variable groups as polymerization catalysts of heterocycles.

12 Claims, No Drawings

USE OF STANNYLENES AND GERMYLENES AS POLYMERIZATION CATALYSTS FOR HETEROCYCLES

This application is a 371 of PCT/FR01/01405 filed May 10, 2001.

The present invention relates to the use of stannylenes and germylenes as polymerization catalysts of heterocycles.

It has been demonstrated that each type of catalyst used for the polymerization or copolymerization of heterocycles, respectively produces different polymers or copolymers, in particular as a result of redistribution reactions [Jedlinski et al., Macromolecules, (1990) 191, 2287; Munson et al., Macromolecules, (1996) 29, 8844; Montaudo et al., Macromolecules, (1996) 29, 6461]. The problem is therefore finding new catalytic systems in order to obtain new polymers or copolymers.

Moreover, the catalytic systems allowing block copolymers to be obtained are of particular interest. In fact, the sequence of monomers can, in this case, be controlled in order to obtain specific copolymers having specific properties. This is particularly useful for biocompatible copolymers, the biodegradation of which is influenced by this sequence.

A subject of the present invention is therefore the use of stannylenes and germylenes of general formula 1

(1)

in which

M represents a tin or germanium atom;

$L_1$ and $L_2$ represent, independently, a group of formula $-E_{14}(R_{14})(R'_{14})(R''_{14})$, $-E_{15}(R_{15})(R'_{15})$ or $-E_{16}(R_{16})$, or together form a chain of formula $-L'_1-A-L'_2-$;

A represents a saturated or unsaturated chain comprising one, two or three elements of group 14, each being optionally and independently substituted by one of the following substituted (by one or more identical or different substituents) or non-substituted radicals: alkyl, cycloalkyl, aryl, in which said substituent is a halogen atom, the alkyl, aryl, nitro or cyano radical;

$L'_1$ and $L'_2$ represent, independently, a group of formula $-E_{14}(R_{14})(R'_{14})-$, $-E_{15}(R_{15})-$ or $-E_{16}-$;

$E_{14}$ is an element of group 14;

$E_{15}$ is an element of group 15;

$E_{16}$ is an element of group 16;

$R_{14}$, $R'_{14}$, $R''_{14}$, $R_{15}$, $R'_{15}$ and $R_{16}$ represent, independently, the hydrogen atom;

one of the following substituted (by one or more identical or different substituents) or non-substituted radicals:alkyl, cycloalkyl or aryl, in which said substituent is a halogen atom, the alkyl, cycloalkyl, aryl, nitro or cyano radical; a radical of formula $-E'_{14}RR'R''$;

$E'_{14}$ is an element of group 14;

R, R' and R" represent, independently, the hydrogen atom or one of the following substituted (by one or more identical or different substituents) or non-substituted radicals:alkyl, cycloalkyl, aryl, in which said substituent is a halogen atom, the alkyl, aryl, nitro or cyano radical;

as polymerization catalysts of heterocycles.

In the definitions indicated above, the expression halogen represents a fluorine, chlorine, bromine or iodine atom, preferably chlorine. The expression alkyl preferably represents a linear or branched alkyl radical having 1 to 6 carbon atoms and in particular an alkyl radical having 1 to 4 carbon atoms such as the methyl, ethyl, propyl, isopropyl, butyl, isobutyl, sec-butyl and tert-butyl radicals.

The cycloalkyl radicals are chosen from saturated or unsaturated monocyclic cycloalkyls. The saturated monocyclic cycloalkyl radicals can be chosen from radicals having 3 to 7 carbon atoms such as the cyclopropyl, cyclobutyl, cyclopentyl, cyclohexyl or cycloheptyl radicals. The unsaturated cycloalkyl radicals can be chosen from the cyclobutene, cyclopentene, cyclohexene, cyclopentadiene, cyclohexadiene radicals.

The aryl radicals can be of mono or polycyclic type. The monocyclic aryl radicals can be chosen from the phenyl radicals optionally substituted by one or more alkyl radicals such as tolyl, xylyl, mesityl, cumenyl. The polycyclic aryl radicals can be chosen from the naphthyl, anthryl, phenanthryl radicals.

The compounds of formula 1 can be presented in the form of monomers or of dimers, the dimers being able to adopt a linear or cyclic structure [C. Glidewell Chem. Scripta (1987) 27, 437]. Thus, the compounds of formula 1 can be presented, when $L_1$ and $L_2$ are independent, in the following forms:

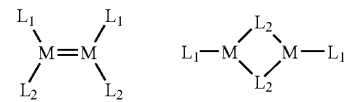

and, when $L_1$ and $L_2$ together form an $-L'_1-A-L'_2-$chain, in the following forms:

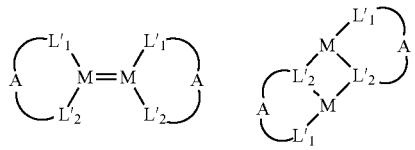

The compounds of formula 1 can comprise one or more solvent molecules [stannylene-tetrahydrofuran complexes were detected spectroscopically: W. P. Neumann Chem. Rev. (1991) 91, 311]. The expression solvent represents an aromatic hydrocarbon such as benzene, toluene; a cyclic or acyclic dialkyl ether such as diethylether, dioxane, tetrahydrofuran, ethyl tertbutyl ether; a chlorinated solvent such as dichloromethane, chloroform; an aliphatic or aromatic nitrile such as acetonitrile, benzonitrile; a cyclic or acyclic, aliphatic or aromatic ketone, such as acetone, acetophenone, cyclohexanone; a cyclic or acyclic, aliphatic or aromatic derivative of carboxylic acid such as ethyl acetate, dimethylformamide.

A more particular subject of the invention is the use as polymerization catalysts of heterocycles, of the products of general formula 1 as defined above, characterized in that M represents a tin atom.

A more particular subject of the invention is also the use as polymerization catalysts of heterocycles, of the products of general formula 1 as defined above, characterized in that $L_1$ and $L_2$ represent, independently, a group of formula $-E_{14}(R_{14})(R'_{14})(R''_{14})$, $-E_{15}(R_{15})(R'_{15})$ or $-E_{16}(R_{16})$.

Preferably, the use as defined above of a compound of formula 1 is such that $E_{14}$ is a carbon or silicon atom;

$E_{15}$ is a nitrogen or phosphorus atom;

$E_{16}$ is an oxygen or sulphur atom;

$R_{14}$, $R'_{14}$, $R''_{14}$, $R_{15}$, $R'_{15}$ and $R_{16}$ represent, independently, the hydrogen atom, an alkyl radical or a radical of formula $-E'_{14}RR'R''$;

$E'_{14}$ is a carbon or silicon atom;

R, R' and R" represent, independently, the hydrogen atom or an alkyl radical.

Preferably also, the use as defined above of a compound of formula 1 is such that $L_1$ and $L_2$ represent, independently, a group of formula $-E_{15}(R_{15})(R'_{15})$ or $-E_{16}(R_{16})$;

$E_{15}$ is a nitrogen atom;

$E_{16}$ is an oxygen atom;

$R_{15}$ and $R'_{15}$ independently represent an alkyl radical or a radical of formula $-E'_{14}RR'R''$;

$R_{16}$ represents an alkyl radical;

$E'_{14}$ represents a silicon atom;

R, R'and R"represent, independently, the hydrogen atom or an alkyl radical.

Preferentially, the compound of formula 1 as defined above, corresponds to one of the following formulae:

$-[(Me_3Si)_2N]_2Sn$;

$-\{[(Me_3Si)_2N]Sn(Ot-Bu)\}_2$.

Certain compounds of formula 1 are known products, i.e. the synthesis and characterization of which have been described [M. F. Lappert et al., J. Chem. Soc., Chem. Commun. (1973), 317; J. J. Zuckerman et al., J. Am. Chem. Soc. (1974) 96, 7160; M. F. Lappert et al., J. Chem. Soc., Chem. Commun. (1974) 895; M. Veith, Angew. Chem., Int. Ed. Engl. (1975) 14, 263; M. F. Lappert et al., J. Chem. Soc., Dalton Trans (1976), 2268; M. F. Lappert et al., J. Chem. Soc., Dalton Trans. (1977), 2004; M. Veith, Z. Naturforsch (1978) 33b, 1; ibid (1978) 33b, 7; M. F. Lappert et al., J. Chem. Soc., Chem. Commun., (1983) 639; ibid (1983) 1492; ibid (1992) 1311; M. F. Lappert et al., J. Am. Chem. Soc, (1980) 102, 2088]. As a result, the new compounds of formula 1 can be prepared by analogy according to the synthesis routes already described.

Moreover, certain compounds of formula 1 have been used in heterocycle polymerization (thioepoxides) [S. Kobayashi et al., Makromol. Chem., Macromol. Symp. (1992) 54/55, 225]. But in this case, they both play the role of comonomer and polymerization initiator (oxidation-reduction copolymerization) and are then stoichiometrically incorporated into the polymerization products. They therefore do not play the role of a catalyst.

The invention relates to the use of products of formula 1 as defined above, as catalysts for the implementation of the (co)polymerization of heterocycles, i.e. polymerization or copolymerization of heterocycles. During the implementation of the (co)polymerization, the compounds according to the invention also play the role of chain initiator or regulator, but are not stoichiometrically incorporated into the (co)polymers.

The heterocycles can contain one or more heteroatoms of groups 15 and/or 16, and be of a size ranging from three to eight members. As examples of heterocycles corresponding to the above formulation, there can be mentioned epoxides, thioepoxides, cyclic thioesters or esters such as lactones, lactames and anhydrides.

The compounds of formula 1 are particularly useful for the implementation of the (co)polymerization of epoxides, in particular of propene oxide. The compounds of formula 1 are also particularly useful for the implementation of the (co)polymerization of cyclic esters. As examples of cyclic esters, there can be mentioned the cyclic ester polymers of lactic and/or glycolic acid. Random or block copolymers can be obtained depending on whether the monomers are introduced together at the beginning of the reaction, or sequentially during the reaction.

A subject of the invention is also a process for the preparation of copolymers, block or random, or polymers and which consists of introducing one or more monomers, a chain initiator, a polymerization catalyst and optionally a polymerization solvent, said process characterized in that the chain initiator and the polymerization catalyst are represented by the same compound which is chosen from the compounds of formula 1 as defined above.

The (co)polymerization can be carried out either in a solution or by supercooling. When the (co)polymerization is carried out in solution, the reaction solvent can be the (or one of the) substrate(s) used in the catalytic reaction. Solvents which do not interfere with the catalytic reaction itself are also suitable. As examples of such solvents, there can be mentioned saturated or aromatic hydrocarbons, ethers, aliphatic or aromatic halides.

The reactions are carried out at temperatures comprised between ambient temperature and approximately 250° C.; the temperature range comprised between 40 and 200° C. being more advantageous. The reaction times are comprised between a few minutes and 300 hours, and preferably between 5 minutes and 72 hours.

This (co)polymerization process is particularly suitable for obtaining cyclic ester (co)polymers, in particular the cyclic ester polymers of lactic and/or glycolic acid. The products obtained such as lactic glycolic copolymer, which are biodegradable, are advantageously used as supports in sustained release therapeutic compositions. The process is also particularly suited to the polymerization of epoxides, in particular propene oxide. The polymers obtained are compounds which can be used for the synthesis of organic liquid crystals or also as semi-permeable membranes.

The process for the (co)polymerization of heterocycles according to the present invention, has numerous advantages, in particular, (co)polymerization catalysts are easily accessible and cheap (co)polymerization can really be carried out in a homogeneous medium so that the mass distribution of the (co)polymers obtained is narrow;

the process is particularly suited to the preparation of block copolymers; the successive addition of monomers in particular allows copolymers to be obtained in blocks.

The invention finally relates to polymers or copolymers which may be obtained by the implementation of a process as described above.

Unless they are defined otherwise, all the technical and scientific terms used in the present application, have the same meaning as that usually understood by an ordinary specialist of the field to which the invention belongs. Similarly, all the publications, patent applications and all other references mentioned in the present application, are incorporated by way of reference.

The following examples are presented in order to illustrate the above procedures and should in no event be considered as a limit to the scope of the invention.

EXAMPLE 1

Preparation of a Random (D,L-lactide/glycolide) Copolymer having a Lactide/glycolide Composition Close to 75/25

0.023 g (0.05 mmol) of $[(Me_3Si)_2N]_2Sn$, 5.66 g (39.3 mmol) of D,L-lactide, 1.52 g (13.1 mmol) of glycolide and 15 ml of mesitylene are introduced successively into a Schlenk tube equipped with a magnetic stirrer and purged under argon. The reaction mixture is left under stirring at 160° C. for 3 hours. NMR analysis of the proton allows verification that the conversion of each of the monomers (lactide and glycolide) is 100%. The ratio of the signal integrals corresponding to the polylactide part (5.20 ppm) and polyglycolide part (4.85 ppm) allows the composition of the copolymer to be evaluated at 75% lactide and 25% glycolide. According to GPC analysis, using a calibration carried out from PS standards with masses 761 to 400 000, this copolymer is a mixture of macromolecules (Mw/Mn=1.67) with quite high masses (Mw=77 500 Dalton).

EXAMPLE 2

Preparation of a Random (D,L-lactide/glycolide) Copolymer with High Masses 0.023 g (0.05 mmol) of $[(Me_3Si)_2N]_2Sn$, 6.03 g (41.9 mmol) of D,L-lactide and 2.08 g (17.9 mmol) of glycolide are introduced successively into a Schlenk tube equipped with a magnetic stirrer and purged under argon. The reaction mixture is left under stirring at 140° C. for 10 minutes. NMR analysis of the proton allows verification that the conversion of the monomers is 83% for the lactide and 100% for the glycolide. The ratio of the signal integrals corresponding to the polylactide part (5.20 ppm) and polyglycolide part (4.85 ppm) allows the composition of the copolymer to be evaluated at 70% lactide and 30% glycolide. According to GPC analysis, using a calibration carried out from PS standards with masses 761 to 400 000, this copolymer is a mixture of macromolecules (Mw/Mn =1.8) of high masses (Mw=164 700 Dalton).

EXAMPLE 3

Preparation of a Random (D,L-lactide/glycolide) Copolymer having a Lactide/glycolide Composition Close to 50/50

0.16 g (0.36 mmol) of $[(Me_3Si)_2N]_2Sn$, 7.87 g (54.7 mmol) of D,L-lactide and 6.34 g (54.7 mmol) of glycolide are introduced successively into a Schlenk tube equipped with a magnetic stirrer and purged under argon. The reaction mixture is left under stirring at 180° C. for 2 hours. NMR analysis of the proton allows verification that the conversion of each of the monomers is 100%. The ratio of the signal integrals corresponding to the polylactide part (5.20 ppm) and polyglycolide part (4.85 ppm) allows the composition of the copolymer to be evaluated at 50% lactide and 50% glycolide. According to GPC analysis, using a calibration carried out from PS standards with masses 761 to 400 000, this copolymer is a mixture of macromolecules (Mw/Mn=1.7) of high masses (Mw=39 000 Dalton).

EXAMPLE 4

Preparation of Another Random (D,L-lactide/glycolide) Copolymer having a Lactide/glycolide Composition Close to 50/50

0.16 g (0.36 mmol) of $[(Me_3Si)_2N]_2Sn$, 8 g (55 mmol) of D,L-lactide and 6.34 g (55 mmol) of glycolide and 25 ml of mesitylene are introduced successively into a Schlenk tube equipped with a magnetic stirrer and purged under argon. The reaction mixture is left under stirring at 180° C. for 2 hours. NMR analysis of the proton allows verification that the conversion of the monomers is 100% lactide and 100% glycolide. The ratio of the signal integrals corresponding to the polylactide part (5.20 ppm) and polyglycolide part (4.85 ppm) allows the composition of the copolymer to be evaluated at 47% lactide and 53% glycolide. According to GPC analysis, using a calibration carried out from PS standards with masses 761 to 400 000, this copolymer is a mixture of macromolecules (Mw/Mn=1.5) of high masses (Mw=39 400 Dalton).

EXAMPLE 5

Preparation of a Block (D,L-lactide/glycolide) Copolymer 2.0 g (14 mmol) of D,L-lactide, 7 ml of mesitylene and 41 mg (0.09 mmol) of $[(Me_3Si)_2N]_2Sn$ are introduced successively into a Schlenk tube equipped with a magnetic stirrer and purged under argon. The reaction mixture is left under stirring at 180° C. for 2 hours. NMR analysis of the proton allows verification that the conversion of the monomer is greater than 96%. GPC analysis, using a calibration carried out from PS standards with masses 761 to 400 000, shows that the polymer is a mixture of macromolecules having masses which are close together (Mw/Mn=1.76; Mw=18 940 Dalton). 0.2 g (1.75 mmol) of glycolide is added to the previous solution maintained under stirring at 180° C. The reaction mixture is left under stirring at 180° C. for 1 hour. Analysis of an aliquot by NMR of the proton shows that the conversion of the glycolide is total and that a copolymer is formed. The ratio of the signal integrals corresponding to the polylactide part (5.20 ppm) and polyglycolide part (4.85 ppm) is 7.3/1. GPC analysis shows that the chains were extended (Mw/Mn=1.89; Mw=21 560 Dalton).

EXAMPLE 6

Preparation of a Random (D,L-lactide/glycolide) Copolymer having a Lactide/glycolide Composition in the Region of 50/50

0.08 g (0.11 mmol) of $\{[(Me_3Si)_2N]Sn(Ot\text{-}Bu)\}_2$, 4.9 g (34 mmol) of D,L-lactide and 3.9 g (34 mmol) of glycolide and 25 ml of mesitylene are introduced successively into a Schlenk tube equipped with a magnetic stirrer and purged under argon. The reaction mixture is left under stirring at 180° C. for 2 hours. NMR analysis of the proton allows verification that the conversion of the monomers is 100% lactide and 100% glycolide. The ratio of the signal integrals corresponding to the polylactide part (5.20 ppm) and polyglycolide part (4.85 ppm) allows the composition of the copolymer to be evaluated at 50% lactide and 50% glycolide. According to GPC analysis, using a calibration carried out from PS standards with masses 761 to 400 000, this copolymer is a mixture of macromolecules (Mw/Mn=1.71) of high masses (Mw=33 140 Dalton).

What is claimed is:

1. In the process of polymerizing heterocyclic compounds, the improvement comprising using a polymerization catalyst of the formula

(1)

wherein

M is tin or germanium;

$L_1$ and $L_2$ are individually selected from the group consisting of $-E_{14}(R_{14})R'_{14})(R''_{14})(R'_{15})$ and $-E_{16}(R_{16})$, or together form $-L'_1\text{-}A\text{-}L'_2$;

A is a saturated or unsaturated chain comprising one, two or three elements of group 14 of the Periodic Table, substituted by one member selected from the group consisting of alkyl, cycloalkyl and aryl, each unsubstituted or substituted with a member selected from the group consisting of halogen, alkyl, aryl, nitro and cyano;

$L'_1$ and $L'_2$ are individually selected from the group consisting of $-E_{14}(R_{14})(R'_{14})-$, $E_{15}(R_{15})-$ and $-E_{16}-$;

$E_{14}$ is an element of group 14 of the Periodic Table;

$E_{15}$ is an element of group 15 of the Periodic Table;

$E_{16}$ is an element of group 16 of the Periodic Table;

$R_{14}$, $R'_{14}$, $R''_{14}$, $R_{15}$, $R'_{15}$ and $R_{16}$ are individually selected from the group consisting of hydrogen, alkyl, cycloalkyl and aryl, unsubstituted or substituted with a member selected from the group consisting of halogen, aryl, cycloalkyl, aryl, nitro and cyano or $-E'_{14}RR'R''-$, $E'_{14}$ is an element of group 14 of the Periodic Table;

R, R' and R" are individually selected from the group consisting of hydrogen, alkyl, cycloalkyl, and aryl, unsubstituted or substituted by a member selected from the group consisting of halogen, alkyl, aryl, nitro and cyano.

2. The process of claim 1 wherein M is tin.

3. The process of claim 1 wherein $L_1$ and $L_2$ are individually selected from the group consisting of $-E_{14}(R_{14}(R'_{14})(R''_{14})$, $-E_{15}(R_{15})(R'_{15})$ and $-E_{16}(R_{16})$.

4. The process of claim 1 wherein $E_{14}$ is carbon or silicon;

$E_{15}$ is nitrogen or phosphorus;

$E_{16}$ is oxygen or sulfur;

$R_{14}$, $R'_{14}$, $R''_{14}$, $R_{15}$ and $R_{16}$ are individually selected from the group consisting of hydrogen, alkyl and $E'_{14}RR'R''$;

$E_{14}$ is carbon or silicon;

R, R' and R" are individually selected from the group consisting of hydrogen or ackyl.

5. The process of claim 1 wherein $L_1$ and $L_2$ are individually $-E_{15}(R_{15})R'_{15}$ or $-E_{16}(R_{16})$;

$E_{15}$ is nitrogen;

$E_{16}$ is oxygen;

$R_{15}$ and $R'_{15}$ are individually alkyl or $-E'_{14}RR'R$ $R_{16}$ is alkyl;

$E'_{14}$ is silicon;

R, R' and R" are individually hydrogen or alkyl.

6. The process of claim 1 wherein the compound of formula 1 is $-[(Me_3Si_2)N]_2Sn$ or $-\{[Me_3Si)_2n]Sn(OtBu)\}_2$.

7. The process of claim 1 wherein the heterocycle is a cyclic ether.

8. The process of claim 7 wherein the cyclic ether is propylene oxide.

9. The process of claim 1 wherein the heterocycle is a cyclic ester.

10. The process of claim 1 wherein the heterocycle compound is a cyclic ester polyner of lactic acid and/or glycolic acid for obtaining a polymer of lactic acid and/or glycolic acid as the heterocyclic.

11. In a process for the preparation of block or random copolymers or polymers comprising introducing one or more heterocyclic monomers, a polymerization catalyst and optionally a polymerization solvent an copolymerizing said monomers, at a temperature between ambient temperature and 250° C., for a duration of a few minutes up to 300 hours, the improvement comprising using as the chain initiator and the polymerization catalyst having the formula

of claim 1.

12. The process of claim 11 wherein the one or more heterocyclic monomers are selected from the group consisting of epoxides and cyclic esters of lactic and/or glycolic acid.

* * * * *